United States Patent
Shi et al.

(10) Patent No.: US 10,738,644 B2
(45) Date of Patent: Aug. 11, 2020

(54) TURBINE BLADE AND METHOD OF FORMING BLADE TIP FOR ELIMINATING TURBINE BLADE TIP WEAR IN RUBBING

(71) Applicant: General Electric Company, Schenectady, NY (US)

(72) Inventors: Jinjie Shi, Clifton Park, NY (US); Dennis Paul Dry, Cincinnati, OH (US); Christopher Edward Wolfe, Niskayuna, NY (US); Andres Jose Garcia-Crespo, Redondo Beach, CA (US); Yun Zhu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 15/690,307

(22) Filed: Aug. 30, 2017

(65) Prior Publication Data
US 2019/0063250 A1    Feb. 28, 2019

(51) Int. Cl.
*F01D 11/12* (2006.01)
*F01D 5/28* (2006.01)
(Continued)

(52) U.S. Cl.
CPC .............. *F01D 11/122* (2013.01); *F01D 5/18* (2013.01); *F01D 5/186* (2013.01); *F01D 5/187* (2013.01); *F01D 5/20* (2013.01); *F01D 5/28* (2013.01); *F01D 5/288* (2013.01); *F05D 2220/32* (2013.01); *F05D 2240/11* (2013.01);
(Continued)

(58) Field of Classification Search
CPC . F01D 11/122; F01D 5/20; F01D 5/18; F01D 5/28; F05D 2300/2263; F05D 2300/2262; F05D 2300/2261; F05D 2300/2282; F05D 2260/2214; F05D 2260/224; F05D 2260/307; F05D 2220/32; F05D 2300/2283; F05D 2300/2284; F05D 2300/2112; F05D 2300/17; F05D 2240/307
See application file for complete search history.

(56) References Cited

U.S. PATENT DOCUMENTS 3,885,886 A    5/1975 Richter
3,934,322 A    1/1976 Hauser et al.
(Continued)

OTHER PUBLICATIONS

Shi, Jinjie, "Compositions and Methods for Coating Metal Turbine Blade Tips", U.S. Appl. No. 15/278,821, filed Sep. 28, 2016. pp. 1-37.

*Primary Examiner* — Hung Q Nguyen
*Assistant Examiner* — Susan E Scharpf
(74) *Attorney, Agent, or Firm* — Paul Diconza

(57) ABSTRACT

Coating systems for a cooled turbine blade tip, such as a metal turbine blade tip, are provided. The coating system includes an abrasive layer overlying the surface of the turbine blade tip. One or more buffer layers may additionally be disposed between an outer surface of the blade tip and the abrasive layer. The coated blade tip can be used with a ceramic matrix composite (CMC) shroud coated with an environmental barrier coating (EBC) to provide improved cooling to the tip so as to lengthen oxidation time of the abrasive layer and reduce blade tip wear. Methods are also provided for forming the cooled blade tip and applying the coating system onto the cooled turbine blade tip.

21 Claims, 8 Drawing Sheets

(51) Int. Cl.
   *F01D 5/18*      (2006.01)
   *F01D 5/20*      (2006.01)
(52) U.S. Cl.
   CPC ............... *F05D 2240/307* (2013.01); *F05D 2260/2214* (2013.01); *F05D 2300/17* (2013.01); *F05D 2300/2112* (2013.01); *F05D 2300/2261* (2013.01); *F05D 2300/2262* (2013.01); *F05D 2300/2263* (2013.01); *F05D 2300/2282* (2013.01); *F05D 2300/2283* (2013.01); *F05D 2300/2284* (2013.01); *F05D 2300/6033* (2013.01)

(56) References Cited

U.S. PATENT DOCUMENTS

| | | | |
|---|---|---|---|
| 4,142,824 A * | 3/1979 | Andersen | F01D 5/187 415/115 |
| 4,169,020 A * | 9/1979 | Stalker | F01D 5/20 205/110 |
| 4,232,995 A * | 11/1980 | Stalker | F01D 5/20 415/173.4 |
| 4,411,597 A | 10/1983 | Koffel et al. | |
| 4,480,956 A | 11/1984 | Kruger et al. | |
| 4,487,550 A * | 12/1984 | Horvath | F01D 5/20 416/92 |
| 4,589,823 A * | 5/1986 | Koffel | F01D 5/20 415/173.4 |
| 4,851,188 A * | 7/1989 | Schaefer | B22F 7/062 419/9 |
| 4,863,348 A | 9/1989 | Weinhold | |
| 5,359,770 A | 11/1994 | Brown et al. | |
| 5,630,314 A * | 5/1997 | Kojima | C23C 4/02 416/241 B |
| 5,660,523 A * | 8/1997 | Lee | F01D 5/20 415/115 |
| 6,042,951 A * | 3/2000 | Kojima | C23C 4/02 416/241 B |
| 6,527,514 B2 * | 3/2003 | Roeloffs | F01D 5/186 416/97 R |
| 6,602,052 B2 * | 8/2003 | Liang | F01D 5/18 416/224 |
| 7,510,370 B2 | 3/2009 | Strangman et al. | |
| 7,632,062 B2 * | 12/2009 | Harvey | F01D 5/20 415/115 |
| 7,836,593 B2 | 11/2010 | Allen | |
| 7,922,451 B1 * | 4/2011 | Liang | F01D 5/187 416/97 R |
| 8,066,485 B1 * | 11/2011 | Liang | F01D 5/186 415/115 |
| 8,206,108 B2 * | 6/2012 | Riahi | F01D 5/147 416/228 |
| 9,278,462 B2 | 3/2016 | Niblock et al. | |
| 9,297,262 B2 * | 3/2016 | Zhang | F01D 5/186 |
| 2003/0207155 A1 * | 11/2003 | Morrison | B32B 18/00 428/699 |
| 2004/0047726 A1 * | 3/2004 | Morrison | F01D 9/04 415/116 |
| 2006/0251916 A1 * | 11/2006 | Arikawa | F01D 5/288 428/632 |
| 2010/0047061 A1 * | 2/2010 | Morrison | F01D 9/04 415/173.1 |
| 2011/0014060 A1 * | 1/2011 | Bolcavage | F01D 5/288 416/241 R |
| 2011/0038710 A1 * | 2/2011 | Kemppainen | F01D 5/288 415/115 |
| 2011/0097599 A1 * | 4/2011 | Hu | B32B 15/01 428/680 |
| 2011/0268584 A1 * | 11/2011 | Mittendorf | C30B 11/00 416/97 R |
| 2012/0084981 A1 * | 4/2012 | Arikawa | F01D 5/288 29/889.721 |
| 2013/0122259 A1 * | 5/2013 | Lee | C23C 30/00 428/164 |
| 2016/0024637 A1 * | 1/2016 | Nakano | C23C 10/04 428/610 |
| 2016/0237832 A1 | 8/2016 | Strock | |

\* cited by examiner

TURBINE BLADE AND METHOD OF FORMING BLADE TIP FOR ELIMINATING TURBINE BLADE TIP WEAR IN RUBBING

BACKGROUND

The subject matter disclosed herein relates to turbine blade tip wear, and more particularly, a cooled turbine blade including a coating system and methods for eliminating turbine blade tip wear in conjunction with a CMC or metal shroud in a gas turbine engine.

The turbine section of a gas turbine engine contains a rotor shaft and one or more turbine stages, each having a turbine disk (or rotor) mounted or otherwise carried by the shaft and turbine blades mounted to and radially extending from the periphery of the disk. A turbine assembly typically generates rotating shaft power by expanding hot compressed gas produced by combustion of a fuel. Gas turbine buckets or blades generally have an airfoil shape designed to convert the thermal and kinetic energy of the flow path gases into mechanical rotation of the rotor.

Within a turbine engine, a shroud is a ring of material surrounding the rotating blades. Ceramic matrix composites (CMCs) are an attractive material for turbine applications, particularly shrouds, because CMCs having high temperature capability and are light weight. However, CMC components must be protected with an environmental barrier coating (EBC) in turbine engine environments to avoid oxidation and recession in the presence of high temperature air flow. Alternatively, metal components may be protected with a thermal barrier coating (TBC) to avoid oxidation and recession in the presence of high temperature air flow.

Turbine performance and efficiency may be enhanced by reducing the space between the tip of the rotating blade and the stationary shroud to limit the flow of air over or around the tip of the blade that would otherwise bypass the blade. For example, a blade may be configured so that its tip fits close to the shroud during engine operation. Thus, generating and maintaining a small tip clearance is particularly desired for efficiency purposes.

During engine operation, the blade tips can sometimes rub against the shroud, thereby increasing the gap and resulting in a loss of efficiency, or in some cases, damaging or destroying the blade set.

To reduce the loss of efficiency, an abradable layer may be deposited on the top of the EBC or TBC on the shroud, or the EBC (or TBC) may serve as the abradable layer. In the high environmental temperatures found in an aircraft engine and a gas turbine, the metal blade strength is decreased and the blade-shroud rubbing further elevates the temperature of the blade tip due to friction caused thermal effect, resulting in severe blade wear. Accordingly, the abradable layer is required to be "softer" than the blades at working temperatures. The abradable layer however cannot be too soft, as they will be eroded too fast. In one particular instance, the abradable layer is formed as, a continuous ceramic layer and is typically quite hard. The hardness of this continuous abradable layer may cause it to not abrade, but rather will cause the tips of the rotating blades to abrade.

In another particular instance, the abradable layer is formed as a series of ceramic ridges that break away upon contact with the rotating blade tip. The ceramic material is typically made out of the same ceramic material as one of the environmental barrier layers, for example, rare earth disilicate or barium strontium aluminosilicate (BSAS). Current efforts in developing abradable materials for gas turbines rely on patterned (camberline, straight line, diamond) or flat (dense and porous) ceramic coatings for the EBC coated shroud while maintaining a reasonable erosion resistance. However, the patterned ridges on the surface of the shroud reduce aerodynamic efficiency and tend to be more expensive and have less thermal protection.

Thus, an improved design of a turbine system using a metal blade and an EBC coated CMC component, particularly a shroud, is desirable in the art.

BRIEF DESCRIPTION

Various embodiments of the disclosure include a coated turbine blade and method of forming blade tip for eliminating turbine blade tip wear in rubbing. In accordance with one exemplary embodiment, disclosed is a coated turbine blade, the coated turbine blade including a turbine blade and a coating system. The turbine bladed defining one or more cooling passages and a blade tip. Each of the one or more cooling passages extending from a plenum defined within the turbine blade to an opening on an outer surface of the blade tip. The turbine blade comprises a base material, wherein the base material comprises a metal. The coating system is disposed along the outer surface of the blade tip. The coating system including a plurality of through-holes extending through the coating system and in fluid communication with the plenum.

In accordance with another exemplary embodiment, disclosed is a system including a turbine blade, an abrasive layer and a shroud. The turbine blade defining one or more cooling passages and a blade tip. Each of the one or more cooling passages extending from a plenum defined within the turbine blade to an opening on an outer surface of the blade tip. The turbine blade comprises a metal base material. The abrasive layer overlying the outer surface of the blade tip and including a plurality of through-holes extending through the abrasive layer and in fluid communication with the plenum. The shroud comprising a ceramic matrix composite (CMC), coated with an environmental barrier coating (EBC).

In accordance with yet another exemplary embodiment, disclosed is a method of forming a turbine blade configured for use with a ceramic matrix composite (CMC) shroud coated with an environmental barrier coating (EBC). The method including casting the turbine blade including a plurality of cooling passages extending from a plenum in the turbine blade to a plurality of cooling passage openings at an outer surface of a blade tip of the turbine blade and applying a coating system on the outer surface of the turbine blade tip, wherein the coating system is disposed along the outer surface of the blade tip and includes a plurality of through-holes extending through the coating system and in fluid communication with the plenum.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
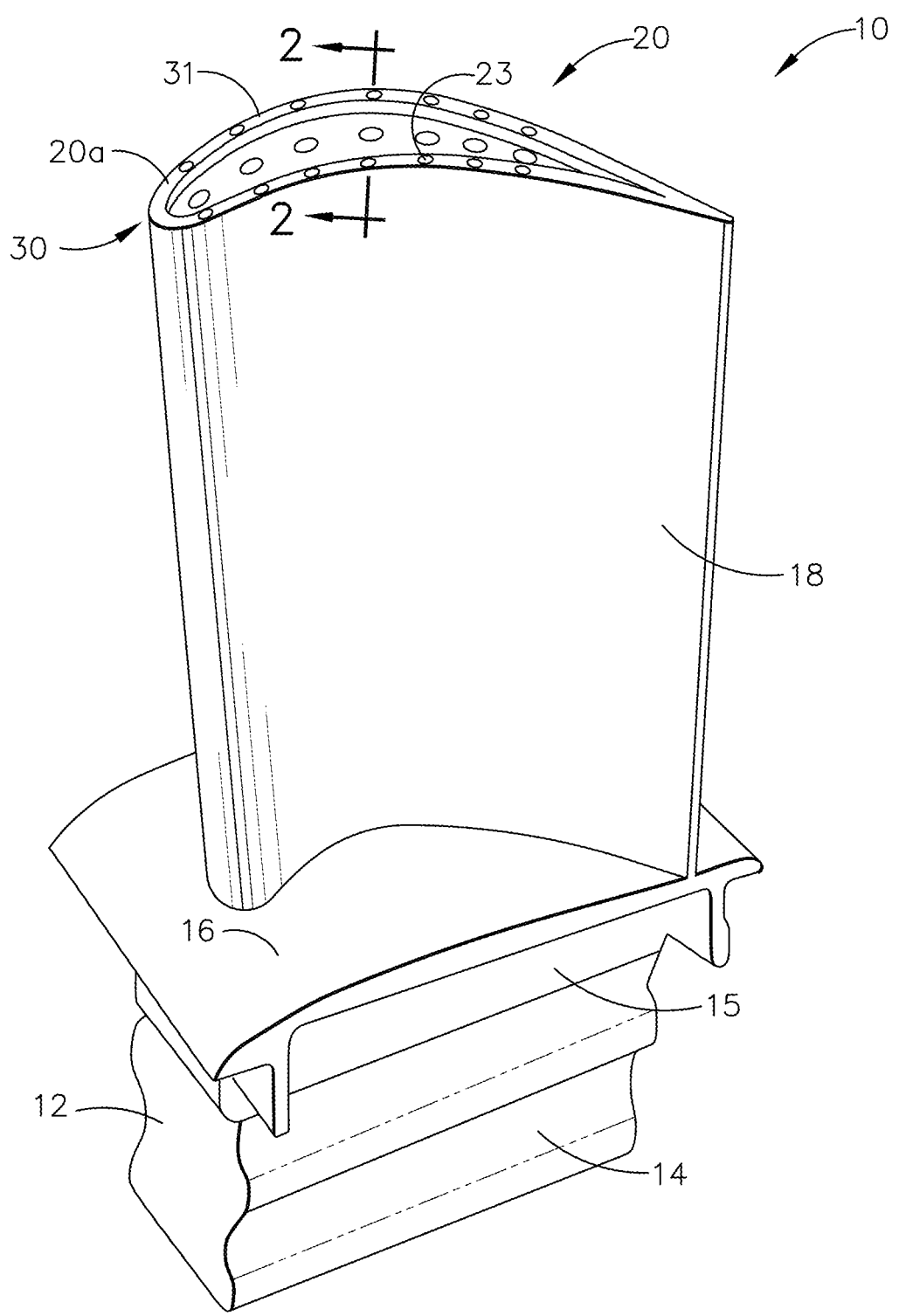
FIG. 1 is a perspective view schematically representing an exemplary turbine blade comprising a cooled blade tip including a coating system disposed thereon, in accordance with one or more embodiments shown or described herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements throughout the drawings.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "upstream" and "downstream" refer to the relative direction with respect of fluid flow in a fluid pathway. For example, "upstream" refers to the direction from which the fluid flows, and "downstream" refers to the direction to which the fluid flows.

In the present disclosure, when a layer is being described as "on" or "overlying" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer and the embodiment being described.

Chemical elements are discussed in the present disclosure using their common abbreviation, such as commonly found on a periodic table of elements. For example, hydrogen is represented by its common chemical abbreviation H; helium is represented by its common chemical abbreviation He; and so forth. As used herein, rare earth elements include, for example, scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, ceramic matrix composite or "CMCs" refers to silicon-containing, or oxide-oxide, matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with a silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide (Al2O3), silicon dioxide (SiO2), aluminosilicates, and mixtures thereof. As used herein, environmental-barrier-coating or "EBCs" refers to a coating system comprising one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g. comprising barium-strontium-aluminum silicate (BSAS), such as having a range of BaO, SrO, $Al_2O_3$, and/or $SiO_2$ compositions), hermetic layer (e.g., a rare earth disilicate) and/or outer coatings (e.g., comprising a rare earth monosilicate, such a slurry or APS-deposited yttrium monosilicate (YMS)). One or more layers may be doped as desired, and the EBC may also be coated with an abradable metal.

As used herein, thermal barrier coating or "TBCs" is used to refer to stabilized ceramics that can sustain a fairly high temperature gradient such that the coated metallic components can be operated at environmental temperatures higher than the metal's melting point. For instance, the TBC may be one or more of cobalt-nickel-chrome-aluminum-yttrium (CoNiCrAlY), yttria stabilized zirconia (YSZ), mullite ($3AL_2O_3$-$2SiO_2$), alumina ($AL_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), and metal glass composites, and combinations thereof (e.g., alumina and YSZ or ceria and YSZ). In that case of YSZ, by substituting a certain amount of zirconium ions ($Zr_4$) with slightly larger yttrium ions ($Y^{3+}$), stable sintered xYSZ (x represents mol % of Yttrium ions, e.g., 8YSZ) can be obtained A metallic turbine blade including a cooled blade tip having a coating system disposed in overlying relationship is generally provided herein, along with methods of forming said metallic turbine blade. The design of the blade tip provides for direct cooling to the blade tip due to a plurality of cooling passages formed therein the blade tip. The composition of the coating system and the methods of applying the coating system to the turbine blade allow for application of an abrasive coating to the air-cooled blade tip of the turbine blade. In another embodiment, a buffer layer may additionally be applied to the narrow blade tip of the turbine blade, prior to the abrasive coating. In one particular embodiment, the plurality of cooling passages of the blade tip in combination with the coating system provides improved thermal protection (reduced oxidation rate and thus extended retention life) for an abrasive grit contained therein the abrasive coating, reduces the wear of the turbine blade tip upon rubbing, and is mechanically resistant to spall and rub in the turbine engine environments.

In one embodiment, the direct cooled blade tip and coating system are generally provided in combination with a CMC shroud coated with an EBC or metal shroud coated with TBC. When applied overlying a blade surface of the direct cooled blade tip, the coating system provides for abrasive grits that are hard enough to cut the EBC or TBC at engine temperature. The cooling flow to the blade tip helps to extend the oxidation life of the abrasive grits to completion of the blade/shroud rub. This arrangement enables a tighter clearance between the rotor-stator interface and thus a higher efficiency without significant change of the current engine platform. In addition, the coating system improves the hardness of the blade tip (in particular during rubbing when the temperature can be much higher than the engine environmental temperature) such that the wear of the blade tip is reduced. Further, the hard abrasive grits in the coating helps to reduce rubbing forces at the rubbing interface, thereby reducing the blade tip temperature. Thus, the coating system serves to protect the underlying metallic turbine blade from both softening and from wear during the wear-in rub.

FIG. 1 shows an exemplary turbine blade 10 of a gas turbine engine. The blade 10 is generally represented as being adapted for mounting to a disk or a rotor within the turbine section of an aircraft gas turbine engine (illustrated in FIGS. 4 and 5). For this reason, the blade 10 is represented as including a dovetail 12 for anchoring the blade 10 to a turbine disk by interlocking with a complementary dovetail slot formed in the circumference of the disk. As represented in FIG. 1, the interlocking features comprise protrusions referred to as tangs 14 that engage recesses defined by the dovetail slot. The blade 10 is further shown as having a platform 16 that separates an airfoil 18 from a shank 15 on which the dovetail 12 is defined.

Figure 2:
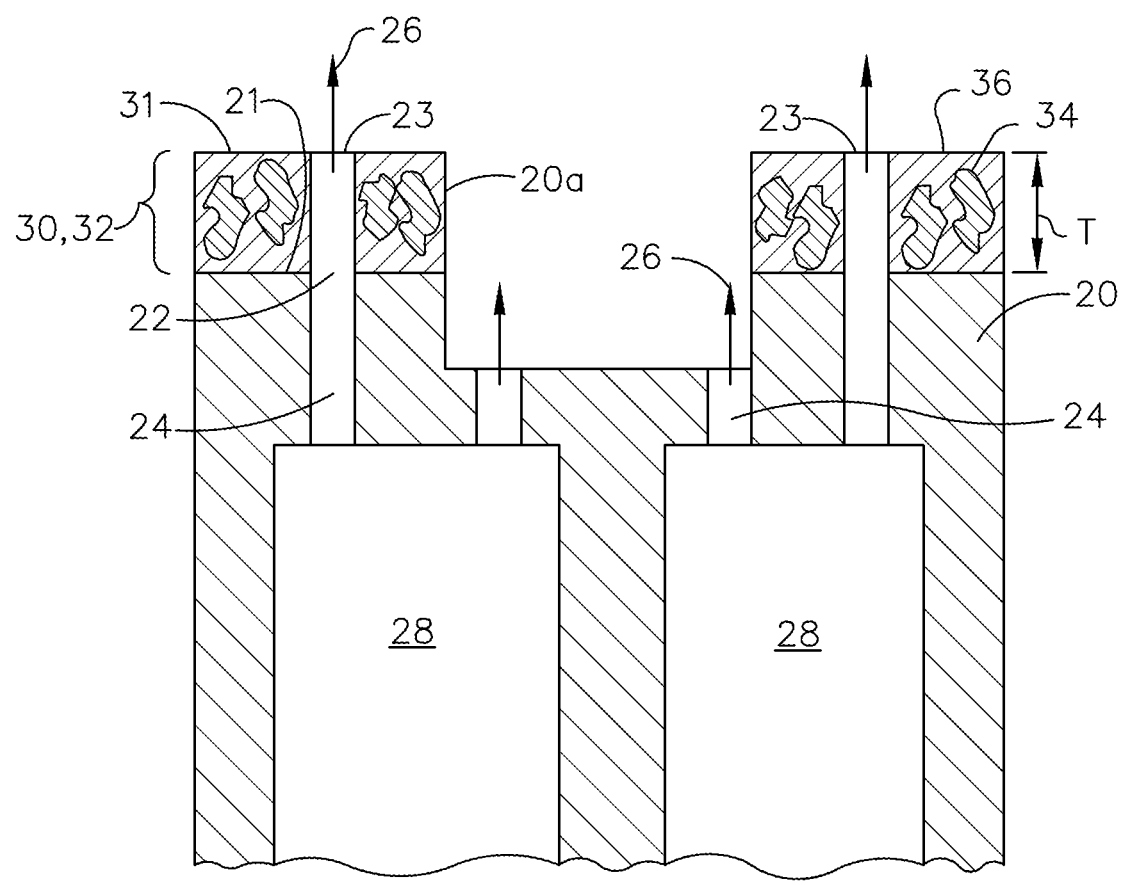
FIG. 2 shows an exemplary coating system positioned on a blade tip of a turbine blade in accordance with one embodiment of the present disclosure.
Figure 3:
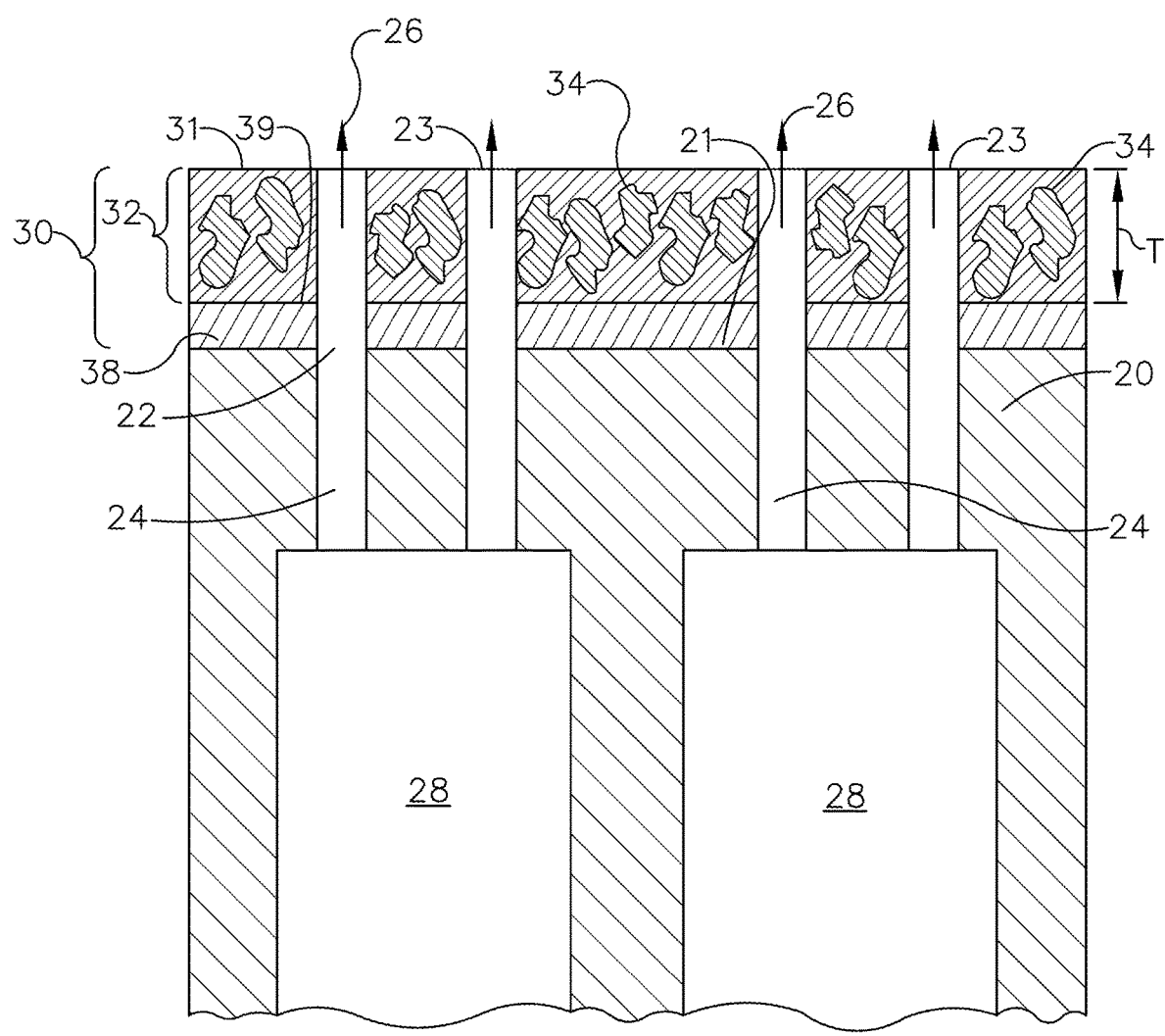
FIG. 3 shows an exemplary coating system positioned on a blade tip of a turbine blade in accordance with one embodiment of the present disclosure.

The blade 10 includes a blade tip 20 disposed opposite the platform 16. As such, the cooled blade tip 20 generally defines the radially outermost portion of the blade 10 and, thus, may be configured to be positioned adjacent to a stationary shroud (112, 114) illustrated in FIG. 5) of the gas turbine engine. As stated above, during use, the blade tip may contact the shroud, causing a rub event between the cooled blade tip 20 and the shroud. The cooled blade tip 20 may also be referred to as the interface between the blade and the shroud and may be referred to as the rubbing area between the blade and the shroud. In an embodiment, the blade tip 20 is configured as a thin wall extrusion along the tip contour, commonly referred to as a squealer tip 20a, (as best illustrated in FIGS. 1 and 2), wherein only a top surface of the squealer tip 21a rubs against the shroud. In an alternate embodiment, the cooled blade tip 20 is substantially flat (as best illustrated in FIG. 3) so that the entire blade tip 20 rubs against shroud. In the embodiments disclosed herein, the cooling passages as well as the abrasive coatings are meant to be applied only to the rubbing areas of blade tip.

Referring still to FIG. 1, as shown, in this embodiment, the blade 10 is generally elongated body with front and back surface as well as slightly rounded corners. At the top of the elongated body is the cooled blade tip 20 which configured as a squealer tip 20a, as previously described. Again, it should be understood that the blade tip 20 of FIGS. 1 and 2 may alternatively be configured as a substantially flat blade tip as further described below. The cooled blade tip 20 is covered with the coating system 30 such that the coating system 30 covers the rubbing area of the blade and becomes the interface between the blade and the shroud. In an embodiment, the coating system 30 may cover the top of the cooled blade tip 20 and extend at least partially over the front and back surfaces of the blade tip 20. In addition, the blade 10 includes a plurality of blade tip cooling passages (described and shown presently) so as to provide blade tip cooling and extend the oxidation life of the coating system 30.

Because components are directly subjected to hot combustion gases during operation of the engine, the airfoil 18, platform 16, and blade tip 20 have very demanding material requirements. The platform 16 and blade tip 20 are further critical regions of a turbine blade in that they create the inner and outer flowpath surfaces for the hot gas path within the turbine section. In addition, the cooled blade tip 20 is subjected to creep due to high strain loads and wear interactions between it and the shroud surrounding the blade tips 20.

In certain embodiment, the cooled blade tip 20 comprises a base material. In some embodiments, the base material includes a metal such as steel or superalloys (e.g., nickel-based superalloys, cobalt-based superalloys, or iron-based superalloys, such as Rene N5, N500, N4, N2, IN718 or Haynes 188) or other suitable materials for withstanding high temperatures. The Ni-based superalloys may be those containing both γ and γ' phases, particularly those Ni-based superalloys containing both γ and γ' phases wherein the γ' phase occupies at least 40% by volume of the superalloy. Such alloys are known to be advantageous because of a combination of desirable properties including high temperature strength and high temperature creep resistance. The base material may also include a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, such as Nb/Ti alloys. The base material may also include a Nb-based alloy that contains at least one secondary phase, such as a Nb-containing intermetallic compound, a Nb-containing carbide, or a Nb-containing boride. Such alloys are analogous to a composite material in that they contain a ductile phase (i.e. the Nb-base alloy) and a strengthening phase (i.e., a Nb-containing intermetallic compound, a Nb-containing carbide, or a Nb-containing boride). As previously stated, the cooled blade tip 20 has formed therein a plurality of cooling passages (described presently) each having an opening (described presently) for the passage therethrough of a cooling flow. Similarly, the coating system 30 includes a plurality of through-holes 23 extending through the coating system and in fluid communication with a plenum, such as plenum 28 of FIG. 2 (described presently). In an embodiment, each through-hole 23 extends from each opening 22, through the coating system 30, to an outer surface 31 of the coating system 30. In another embodiment, each of the plurality of through-holes 23 is machined through the coating system 30 and the blade tip 21.

Referring more specifically to FIG. 2, illustrated in cross-section taken through line 2-2- of FIG. 1, is the cooled blade tip 20. As illustrated, the cooled blade tip 20 includes a series of internal cooling passages 24, also referred to herein as micro-cooling channels. A cooling fluid 26 may be provided to the internal cooling passages 24 from a plenum 28, and the cooling fluid 26 may flow through the internal cooling passages 24, cooling the blade tip 20 and the coating system 30. In an embodiment, the cooling passages 24 are formed during the casting of turbine blade 10. In an alternate embodiment, the cooling passages 24 are fabricated subsequent to fabrication of the blade 10, and more particularly, are post-added via machining using conventional electrical discharge machining (EDM), electrochemical machining (ECM) or laser perforation, such as through laser and electro chemical machining (STEM). In yet another embodiment, the cooling passages 24 are formed through additive manufacturing.

Referring still to FIGS. 1 and 2, in the illustrated embodiment, the cooled blade tip 20 is coated with the coating system 30. The coating system 30 is disposed overlying the cooled blade tip 20 in FIG. 1, and may be disposed along the cooled blade tip 20 as well as other portions of the airfoil 18. The coating system 30 covers at least a portion of the cooled blade tip 20, and in some cases, the coating system 30 covers the portion of the cooled blade tip 20 most immediately adjacent to the shroud when positioned in the turbine section of the engine (see FIG. 5)

The coating system 30 is configured such that wear and softening of the cooled blade tip 20 is reduced. During operation, the cooled blade tip 20 and shroud (112, 114 illustrated in FIG. 5) can face temperatures over about 2200° F. (1205° C.), such as over about 2300° F. (1260° C.), such as about 2300° F. (1260° C.) to about 2400° F. (1316° C.) upon rubbing. The coating system 30 incorporates components that can withstand these high temperatures to aid in the rubbing process and protect the underlying metal from the high temperatures. For instance, in certain embodiments, the coating system 20 comprises an abrasive layer (described presently) overlying the cooled blade tip 20 including a plurality of abrasive particles disposed in a matrix alloy. In certain embodiments, the coating system 20 may further comprise a buffer layer (described herein) and/or a thermal barrier coating ("TBC") disposed along the cooled blade tip 20 and underlying the abrasive layer.

FIG. 2 shows the formation of an exemplary coating system 30 positioned on a blade tip 20 including a plurality of the internal cooling passages 24 formed therein, in accordance with one embodiment of the present disclosure. As shown in FIG. 2, in this embodiment, the coating system 30 is comprised of an abrasive layer 32 disposed overlying the cooled blade tip 20, and more particularly, disposed on and along the cooled blade tip 20. As shown in FIG. 2, in this embodiment, an outer surface 21 of the cooled blade tip 20 is coated with the coating system 30. The coating system 30 is disposed along the cooled blade tip 20 in FIG. 2, and may be disposed along the cooled blade tip 20 as well as other portions of the airfoil 18 (shown in FIG. 1). The coating system 30 covers at least a portion of the cooled blade tip 20, and in some cases, the coating system 30 covers the portion of the cooled blade tip 20 most immediately adjacent to the shroud when positioned in the turbine section of the engine (see FIG. 5). The present coating system 30 can be applied to narrow blade tips and still provide the above discussed benefits such as thermal protection and protection from blade wear.

The abrasive layer 32 is comprised of a plurality of abrasive grit particles 34 encapsulated within a matrix alloy 36. In an embodiment, the abrasive grit particles 34 are comprised of cubic boron nitride (cBN) disposed in a matrix alloy 36. Alternate, abrasive grit particles, such as alumina ($Al_2O_3$), diamond, rhenium diboride (c-axis), silicon carbide, titanium carbide, tungsten carbide, titanium nitride, silicon nitride, tantalum carbide, or any mixture thereof, may also be utilized in the coating system 30. In an embodiment, the matrix alloy 36 is comprised of cobalt-nickel-chrome-aluminum-yttrium (CoNiCrAlY).

FIG. 3 shows the formation of an exemplary coating system 30 positioned on a blade tip 20, and in particular a substantially flat blade tip, including a plurality of the cooling passages 24 formed therein, in accordance with another embodiment of the present disclosure. It should be understood that the blade tip 20 of FIG. 3 may alternatively be configured as a squealer blade tip as previously described. As shown in FIG. 3, in this embodiment, the coating system 30 may include additional layers than as described in FIG. 2, and more particularly is comprised of a buffer layer 38 disposed along the cooled blade tip 20 and an abrasive layer 32 disposed on an outer surface 39 of the buffer layer. As shown in FIG. 3, in this embodiment, the cooled blade tip 20 is coated with the coating system 30. The coating system 30 is disposed along the cooled blade tip 20 in FIG. 3, and may be disposed along the cooled blade tip 20 as well as other portions of the airfoil 18 (shown in FIG. 1). The coating system 30 covers at least a portion of the cooled blade tip 20, and in some cases, the coating system 30 covers the portion of the cooled blade tip 20 most immediately adjacent to the shroud when positioned in the turbine section of the engine (see FIG. 5).

The buffer layer 38 may be formed of any suitable material, bonded to the outer surface 21 of the cooled blade tip 20. More particularly, the buffer layer 38 may be any suitable buffer layer 38 for improving the adherence of the abrasive layer 32 to the underlying blade tip 30 and/or properties of the abrasive layer 32. For instance, in some embodiments, a platinum modified nickel aluminide buffer layer 38 may be formed on the cooled blade tip 20; in some embodiments, a cobalt-nickel-chrome-aluminum-yttrium (CoNiCrAlY) buffer layer 38 may be formed on the cooled blade tip 20 Without intending to be limiting, the buffer layer 38 may increase the effective bonding strength and thus duration for the abrasive layer 32 to the cooled blade tip 20 allowing for application of the abrasive layer 32 to the narrow blade tip 20. The bonding layer 38 may thereby provide improved mechanical strength of the abrasive layer 32 and bonding strength of the abrasive layer 32 to the cooled blade tip 20. In addition, the buffer layer 38 may help to release thermal stress during thermal cycles (e.g., rubbing-windage cooling-rubbing), thus reducing the occurrence of spallation of the abrasive layer 32 and may prevent or reduce oxidation of the cooled blade tip 20. For particular configurations, the buffer layer 38 may be a thermal barrier coating (TBC) layer. In alternate configurations, the buffer layer 38 may be formed of a similar composition or the same alloy as the blade tip 20. The buffer layer 38 may be any suitable thickness to provide the desired benefits of improved adherence and reduced spallation. For instance, in some embodiments, the buffer layer 38 may be about 1 micron to about 400 microns, such as about 25 microns to about 380 microns, about 50 microns to about 250 microns, or about 75 microns to about 200 microns thick. The buffer layer may be formed by any suitable process. As illustrated in FIG. 3, in this particular embodiment the abrasive layer 32, comprised of the abrasive grit particles 34 encapsulated within the matrix alloy 36, is disposed on an outer surface 39 of the buffer layer 38. In an embodiment, the buffer layer 38 is comprised of multiple layers with each layer material providing a specific function (or functions) to enhance the bond of the abrasive layer 32 to the blade tip 20.

Referring to FIGS. 2 and 3, in an embodiment, the matrix alloy 36, of the abrasive layer 32 is of sufficient thickness "T", so as to encapsulate the plurality of abrasive grit particles 34 disposed therein. It is well known that hardness is a crucial property of any abrasive grit particle. However, most abrasives, such as those used herein, suffer a loss in hardness and shorter oxidation life at elevated temperatures, although cBN provides improved physical properties by maintaining hardness over a wider temperature range. Encapsulation of the abrasive grit particles 34 within the matrix alloy 36 provides protection to the particles 34 and more particularly, avoids direct exposure of the abrasive grit particles 34 to oxidation. The combined use of this abrasive grit particle encapsulation with the cooling flow 26 through the cooled blade tip 20, as previously described, provides for a drop in the bulky temperature of the abrasive layer 32 and extends the oxidation life. The abrasive layer 32, and more particularly the plurality of abrasive grit particles 34 enable blade cutting of the EBC/TBC shroud sacrificial coating (also referred to herein as a rub), with minimal wear to the cooled blade tip 20, and the tip cooling flows 26 guarantee the abrasive grit particles 34 remain long enough in engine operation conditions to complete the rub.

The coating system 30 may be formed by any suitable process. For instance, laser cladding may be used to form the coating system 30, and more particularly the abrasive layer 32, and any additional layers disposed between the abrasive layer 32 and the outer surface 21 of the cooled blade tip 20. During the laser cladding process to form the abrasive layer 32, a metal alloy powder and an abrasive powder feedstock materials (such as those previously identified) are melted and consolidated by use of a laser, to deposit a laser clad material layer, and more particularly, the abrasive layer 32, on the outer surface 21 of the cooled blade tip 20, as illustrated in FIG. 2. In the embodiment of FIG. 3, a first metal alloy powder is melted and consolidated by use of a laser, to deposit a laser clad material layer, and more particularly, the buffer layer 38, on the outer surface 21 of the cooled blade tip 20 for improved lattice matching. A second metal alloy powder and abrasive powder are next melted and consolidated by use of a laser to deposit a laser clad material layer, and more particularly the abrasive layer 32, on an outer surface 39 of the buffer layer 38. In an embodiment, the first metal alloy powder and the second metal alloy powder comprise the same material. In an embodiment, the first metal alloy powder and the second metal alloy powder comprise different materials. In an embodiment, the first metal alloy powder and the second metal alloy powder comprise the same material as the blade material. In an embodiment, the first metal alloy powder and the second metal alloy powder comprise different materials than the blade materials. In alternate embodiments, braze technology or additive methods are used to form the buffer layer 38 (when included) and/or the abrasive layer 32.

In a disclosed method of fabrication, the blade 10 is a cast blade, and the cooling passages 24 may be cast simultaneously during the blade 10 casting process. Next, laser cladding is used to form the abrasive layer 32 on the cooled blade tip 20. If required, the buffer layer 38 may initially be deposited on the outermost surface 21 of the blade 20, prior to laser cladding the abrasive layer 32. Subsequent to deposition of the coating system 30, EDM, or other processes, are used to extend the cooling passages 24 of the blade through the coating system 30.

As an alternate method of fabrication, the blade 10 is a cast blade, and the cooling passages 24 may be cast simultaneously during the blade 10 casting process. Next, laser cladding is used to form the abrasive layer 32 on the cooled blade tip 20 without covering the cooling flow exit holes 22. In yet another embodiment, alternate additive manufacturing processes may be used to deposit the coating system 30 on the outer surface 21 of the blade tip 20.

Commercial aircraft engine blade tips are typically about 25-150 mils wide (about 635-3810 microns). The present cooling passages 24 and coating system 30 can be formed in and applied, respectively, to such narrow blade tips and still provide the above-described benefits such as thermal protection and protection from blade wear. The coating system can be applied to blade tips of any width but would generally be applied to blade tips less than about 300 mils wide and greater than about 25 mils wide, such as about 30 mils to about 120 mils wide or about 30 mils to about 60 mils wide. The coating system may cover the entire width of the blade tip or may cover a portion of the width of the blade tip. Various alternative configurations are possible without deviating from the intent of the present disclosure.

The described blade tip having included therein cooling channels and a coating system on an outer surface, as disclosed, provides a reduction in blade loss during a rub event. The cooled blade tip provides for a direct cooling flow that provides a drop in blade tip temperature, which is critical to extend the oxidation life of the abrasive grit particles to an acceptable level, and thus increase the fatigue life of the turbine blade, reducing the cost of blade repairing/replacement. The application of the coating system, including abrasive grit particles as described herein, is accomplished through laser cladding, which can be easily integrated with the current manufacturing/assembly line of turbine blade.

Figure 4:
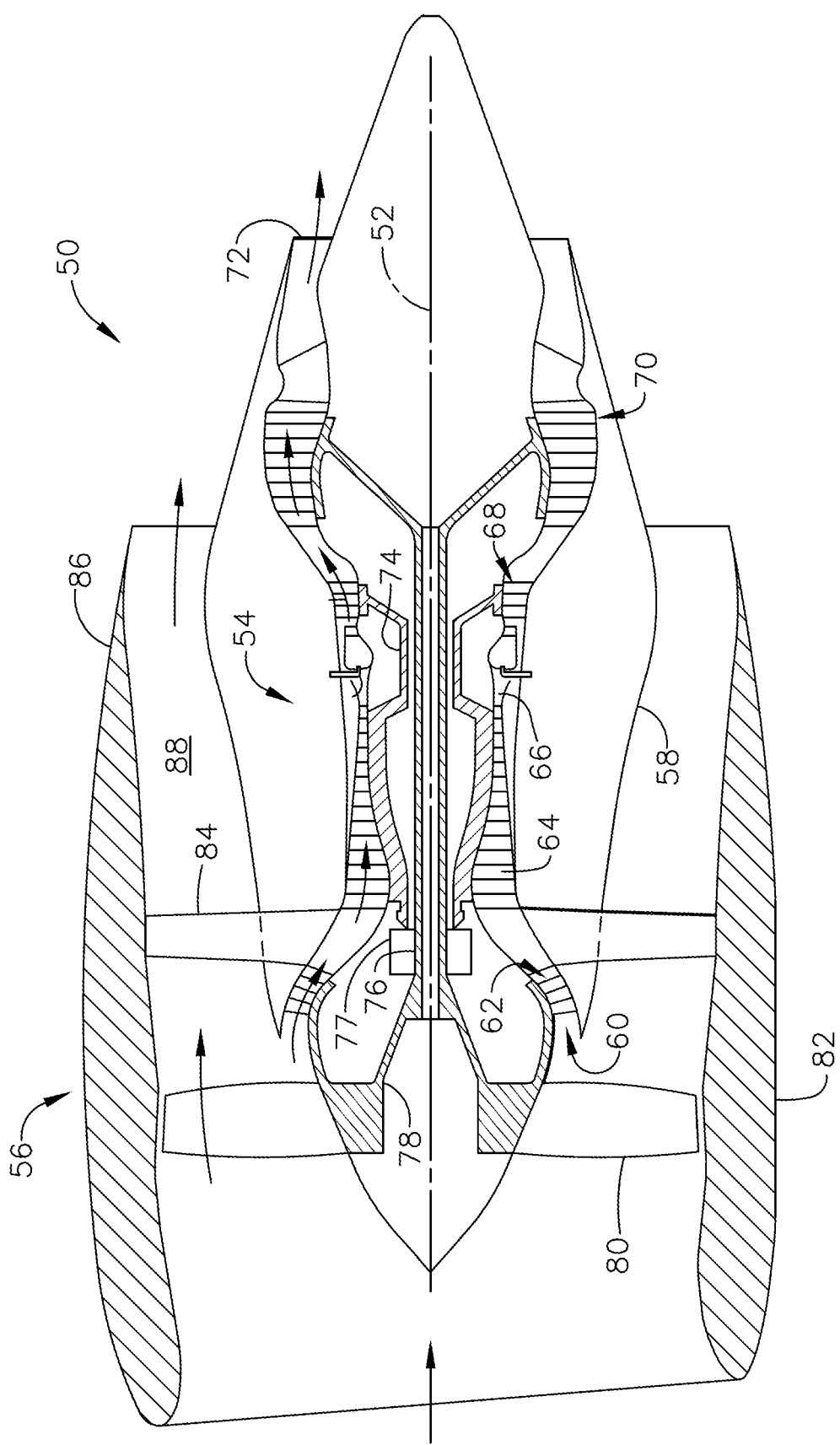
FIG. 4 is a schematic cross-sectional view of a gas turbine engine in accordance with one embodiment of the present disclosure.

FIG. 4 is a schematic cross-sectional view of a gas turbine engine in accordance with one embodiment of the present disclosure. Although further described below generally with reference to a turbofan 50, the present disclosure is also applicable to turbomachinery in general, including turbojet, turboprop and turboshaft gas turbine engines, including industrial and marine gas turbine engines and auxiliary power units.

As shown in FIG. 4, the turbofan 50 has a longitudinal or axial centerline axis 52 that extends therethrough for reference purposes. In general, the turbofan 50 may include a core turbine or gas turbine engine 54 disposed downstream from a fan section 56.

The gas turbine engine 54 may generally include a substantially tubular outer casing 58 that defines an annular inlet 60. The outer casing 58 may be formed from multiple casings. The outer casing 58 encases, in serial flow relationship, a compressor section having a booster or low pressure (LP) compressor 62, a high pressure (HP) compressor 64, a combustion section 66, a turbine section including a high pressure (HP) turbine 68, a low pressure (LP) turbine 70, and a jet exhaust nozzle section 72. A high pressure (HP) shaft or spool 74 drivingly connects the HP turbine 68 to the HP compressor 64. A low pressure (LP) shaft or spool 76 drivingly connects the LP turbine 70 to the LP compressor 62. The (LP) spool 76 may be connected to a fan spool 78 via a speed reduction device 77 such as a reduction gear gearbox in an indirect-drive or geared-drive configuration. Such speed reduction devices may be included between any suitable shafts/spools within turbofan 50 as desired or required.

As shown in FIG. 4, the fan section 56 includes a plurality of fan blades 80 that are coupled to and that extend radially outwardly from the fan spool 78. An annular fan casing or nacelle 82 circumferentially surrounds the fan section 56 and/or at least a portion of the gas turbine engine 54. It should be appreciated by those of ordinary skill in the art that the nacelle 82 may be configured to be supported relative to the gas turbine engine 54 by a plurality of circumferentially-spaced outlet guide vanes 84. Moreover, a downstream section 86 of the nacelle 82 (downstream of the guide vanes 84) may extend over an outer portion of the gas turbine engine 54 so as to define a bypass airflow passage 88 therebetween.

Figure 5:
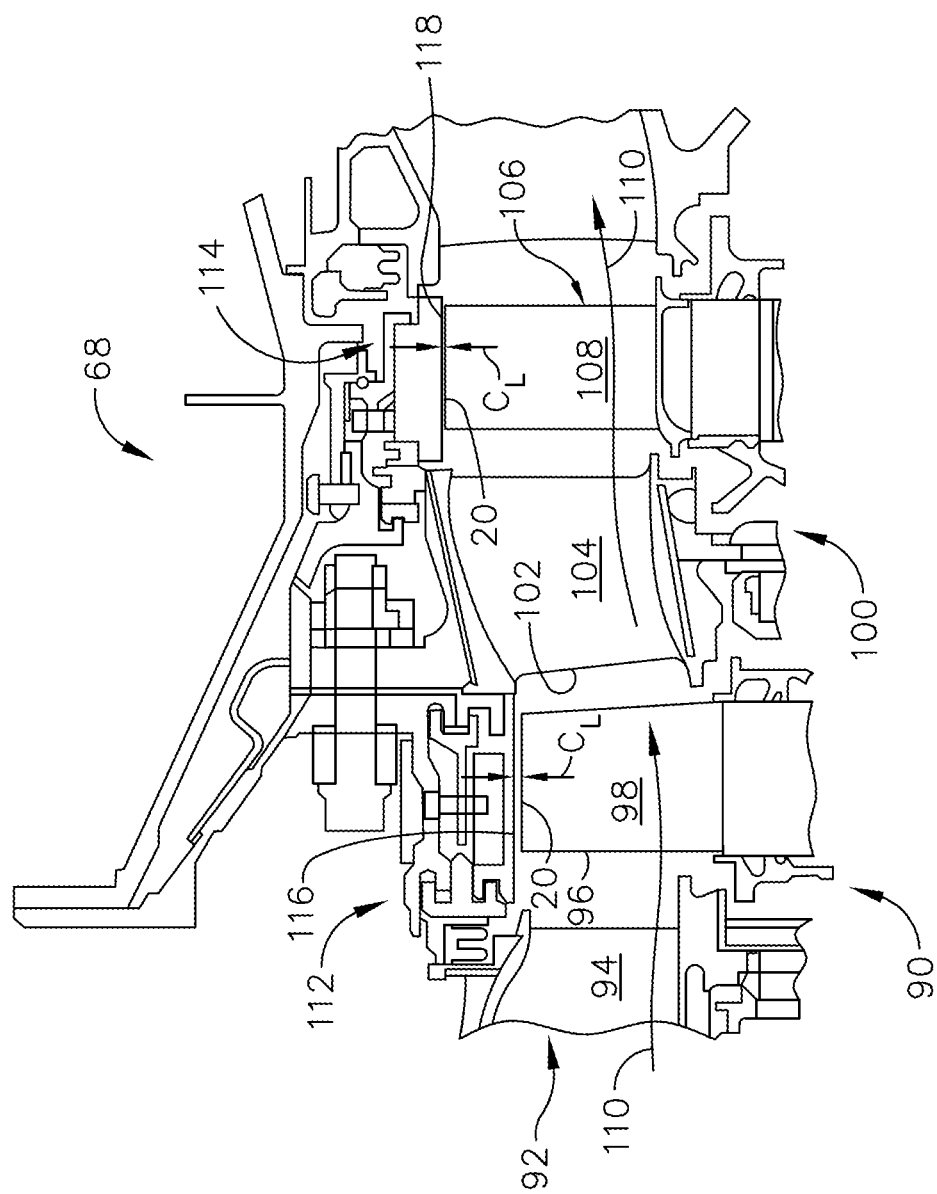
FIG. 5 is an enlarged cross sectional side view of a high pressure turbine portion of a gas turbine engine of FIG. 4, in accordance with one embodiment of the present disclosure.

FIG. 5 provides an enlarged cross-sectional view of the HP turbine 68 portion of the gas turbine engine 54 as shown in FIG. 4 and may incorporate various embodiments of the present disclosure. As shown in FIG. 5, the HP turbine 68 includes, in serial flow relationship, a first stage 90 which includes an annular array 92 of stator vanes 94 (only one shown) axially spaced from an annular array 96 of turbine rotor blades 98 (only one shown) (also referred to as "turbine blades") including a cooled tip 20. The HP turbine 68 further includes a second stage 100 which includes an annular array 102 of stator vanes 104 (only one shown) axially spaced from an annular array 106 of turbine rotor blades 108 (only one shown) (also referred to as "turbine blades") including a cooled tip 20. The turbine rotor blades 98, 108 extend radially outwardly from and are coupled to the HP spool 74 (FIG. 4). As shown in FIG. 5, the stator vanes 94, 104 and the turbine rotor blades 98, 108 at least partially define a hot gas path 110 for routing combustion gases from the combustion section 66 (FIG. 4) through the HP turbine 68.

As further shown in FIG. 5, the HP turbine may include one or more shroud assemblies, each of which forms an annular ring about the annular array of turbine blades 98, 108. For example, a shroud assembly 112 may form an annular ring around the annular array 96 of turbine blades 98 of the first stage 90, and a shroud assembly 114 may form an annular ring around the annular array 106 of turbine blades 108 of the second stage 100. In general, shrouds of the shroud assemblies 112, 114 are radially spaced from the cooled blade tips 20 of each of the turbine blades 98, 108. A radial or clearance gap, also referred to herein as a local clearance "CL" is defined between the cooled blade tips 20 and inner surfaces 116, 118 of the shrouds of the shroud assemblies 112, 114, respectively. The shrouds and shroud assemblies generally reduce leakage from the hot gas path 110.

It should be noted that shrouds and shroud assemblies may additionally be utilized in a similar manner in the low pressure compressor 62, high pressure compressor 64 and/or low pressure turbine 70. Accordingly, shrouds and shroud assemblies as disclosed herein are not limited to use in HP turbines, and rather may be utilized in any suitable section of a gas turbine engine.

While not illustrated in FIGS. 4 and 5, the cooled blade tips 20 include the cooling passages 24 and are coated with the coating system 30, which includes the abrasive layer 32 and may further include a buffer layer 38 as disclosed herein. Also not illustrated in FIGS. 4 and 5, the inner surfaces 116, 118 of the shrouds of the shroud assemblies 112, 114 are coated with one or more EBCs. The shrouds may be formed of a CMC.

Figure 6:
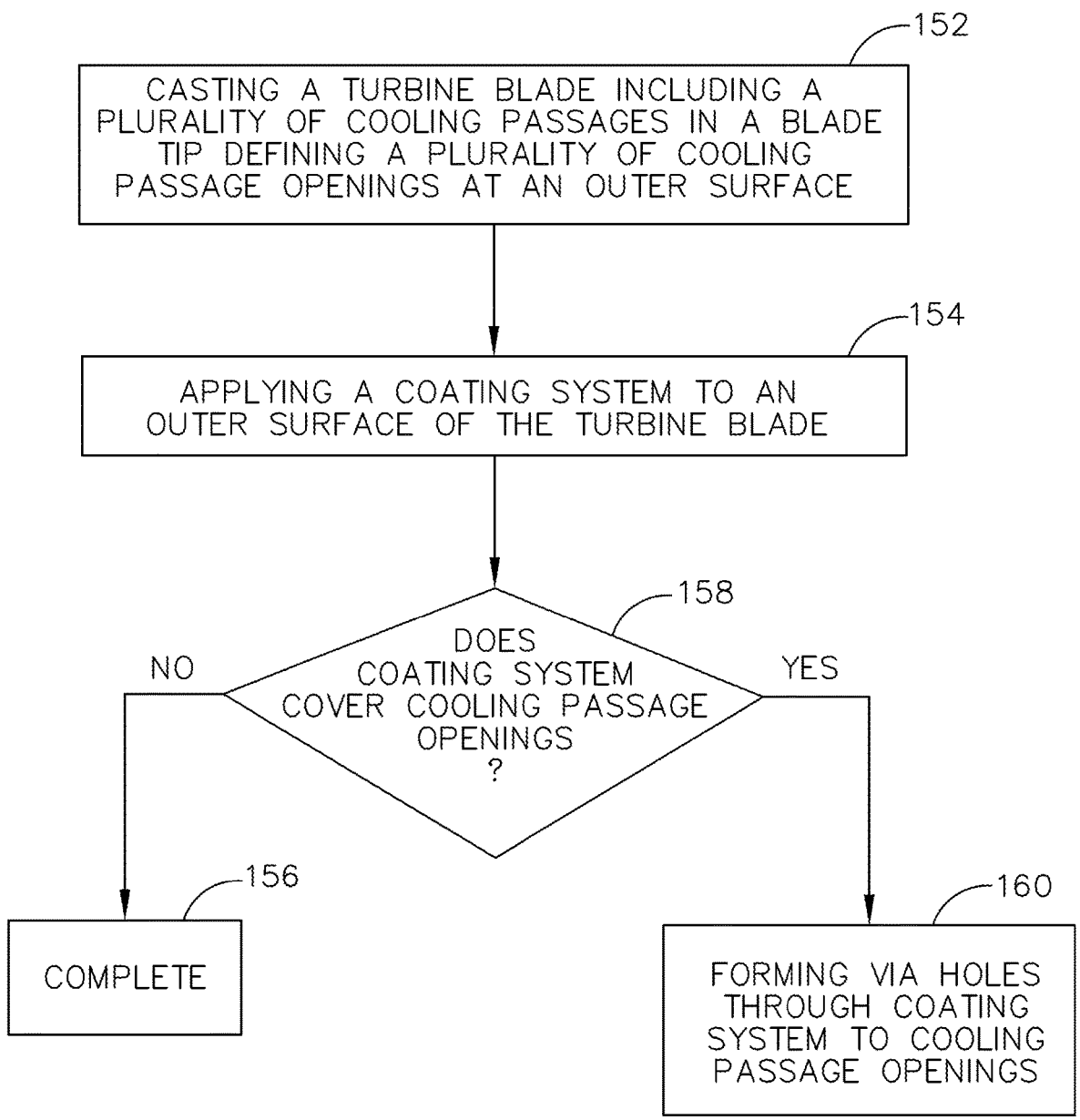
FIG. 6 is a flowchart of a method of forming a turbine blade comprising a cooled blade tip and a coating system, in accordance with one embodiment of the present disclosure.

FIG. 6 is a flowchart of a method 150 of preparing a turbine blade comprising a plurality of internal cooling passages 24 and a coating system 30, in accordance with one embodiment disclosed herein. As shown in FIG. 6, in this embodiment, the method 150 of preparing a turbine blade, particularly a blade configured for use with a CMC shroud coated with an environmental barrier coating, comprises the step of casting a turbine blade 10 including a plurality of internal cooling passages 24 in the cooled blade tip 20, in a step 152. As previously described, each of the cooling passages 24 extends from an interior plenum 28 to an opening 22 on an outer surface 21 of the cooled blade tip 20. Next, the coating system 30 is applied in a step 154. The coating system 30 may be applied by any suitable method as described herein. In an embodiment, the step of applying the coating system 30 includes applying an abrasive layer 32 to the outer surface 21 of the cooled blade tip 20. In another embodiment, the step of applying the coating system 30 includes applying a buffer layer 38 to the outer surface 21 of the cooled blade tip 20 and applying the abrasive layer 32 on an outer surface 39 of the buffer layer 38. The step of applying the abrasive layer 32 includes applying the abrasive layer to either cover the plurality of cooling passage openings 22 formed in the cooled blade tip 20 or leave the cooling passage openings 22 clear of the abrasive layer 32. In an embodiment, the cooling passage openings 22 may remain open through the coating system 30 such as when the coating system 30 is epitaxially grown so as to include a through-hole 23 extending through the coating system 30 and in fluid communication with the cooling passages 22, or deposited in such a manner to preclude deposition of the coating system 30 over the cooling passage openings 22. In an embodiment where the cooling passage opening are covered during the deposition of the coating system 30, a plurality of through-holes 23 extending through the coating system 30 may be formed in an additional step 160.

Figure 7:
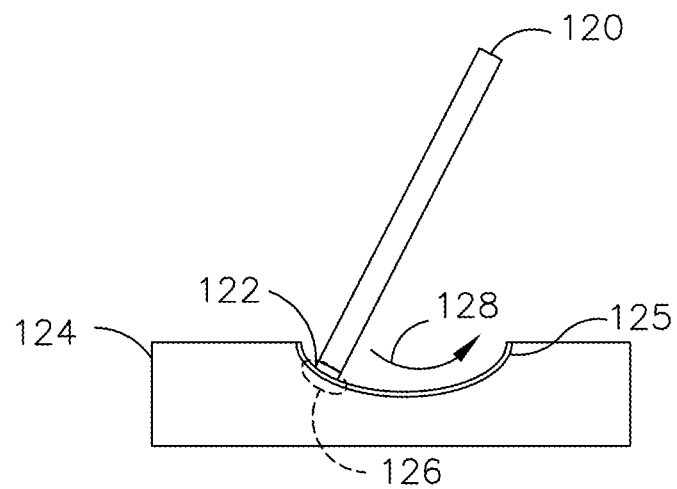
FIG. 7 is a schematic illustration of the interaction of a known turbine blade and a shroud during a rubbing event.

FIG. 7 illustrates schematically the interaction of a typical metallic turbine blade 120, and more specifically a blade tip 122, and a shroud 124, having an abradable layer 125, such as an abradable EBC layer, disposed on the shroud 124, during a rubbing event. More specifically, illustrated is the rubbing at an interface 126 of the metallic blade tip 122 and the abradable EBC layer 125 during rotation of the turbine blade 120, as indicated by arrow 128, resulting in damage and wear to the blade tip 122, and ultimate blade loss to the blade 120. More specifically, the blade loss is typically due to over-heating of the blade tip 122 during rubbing (environmental temperature+friction heating) as the strength of the blade tip 122 is lower than the abradable layer 125.

Figures 8, 9:
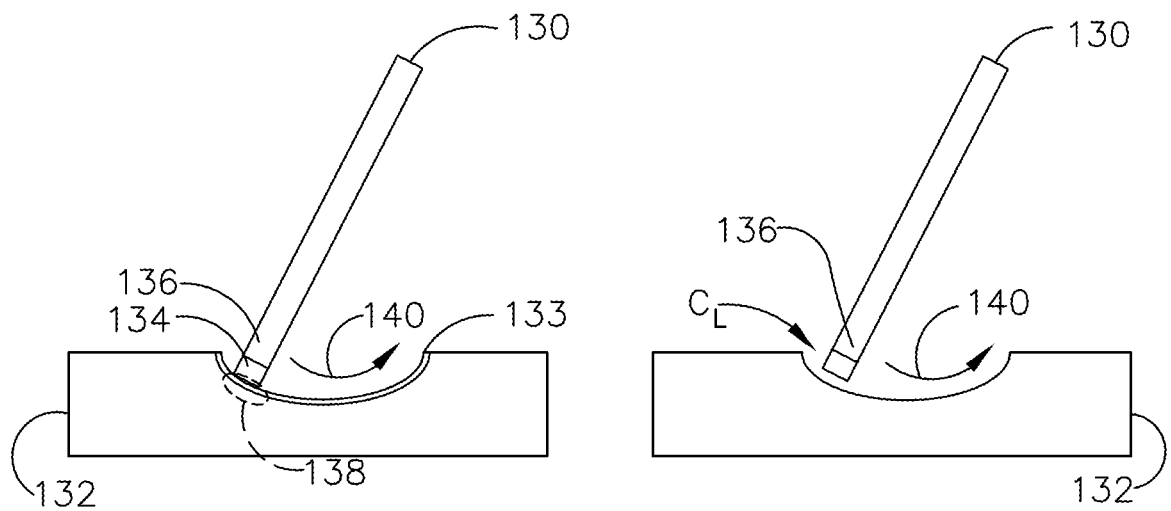
FIG. 8 is a schematic illustration of the interaction of a turbine blade and a shroud during a rubbing event, in accordance with one embodiment of the present disclosure.
FIG. 9 is a schematic illustration of the interaction of a turbine blade and a shroud subsequent to a rubbing event, in accordance with one embodiment of the present disclosure.

In comparison, illustrated in FIGS. 8 and 9 is a turbine blade 130 formed according to this disclosure. More particularly, illustrated is the turbine blade 130, such as turbine blade 98, 108 of FIGS. 4 and 5 and a shroud 132 having an abradable EBC layer 133 disposed thereon, such as shroud 112, 114 of FIG. 5, during a rubbing event. The turbine blade 130 includes a plurality of cooling passages formed therein (not shown), generally similar to cooling passages 24 of FIGS. 1-3, and having a coating system 134 disposed on a blade tip 136. Illustrated is the rubbing at an interface 138 of the coating system 134 disposed on the blade tip 120 and the abradable EBC layer 133 during rotation of the turbine blade 130, as indicated by arrow 140, and as best illustrated in FIG. 8. Subsequent to a full rotation of the turbine blade 130, or a complete rub, a radial or clearance gap, $C_L$ is defined between the cooled blade tip 136 and an inner surface of the shroud 132, as best illustrated in FIG. 9, without damage to the cooled blade tip 136. The plurality of abrasive grit particles encapsulated within the matrix alloy of the coating system 30 are no longer needed and may be volatized subsequent to completion of the rub. In light of the blade cooling (lower environmental temperature and friction heating) blade wear is minimized.

Figure 10:
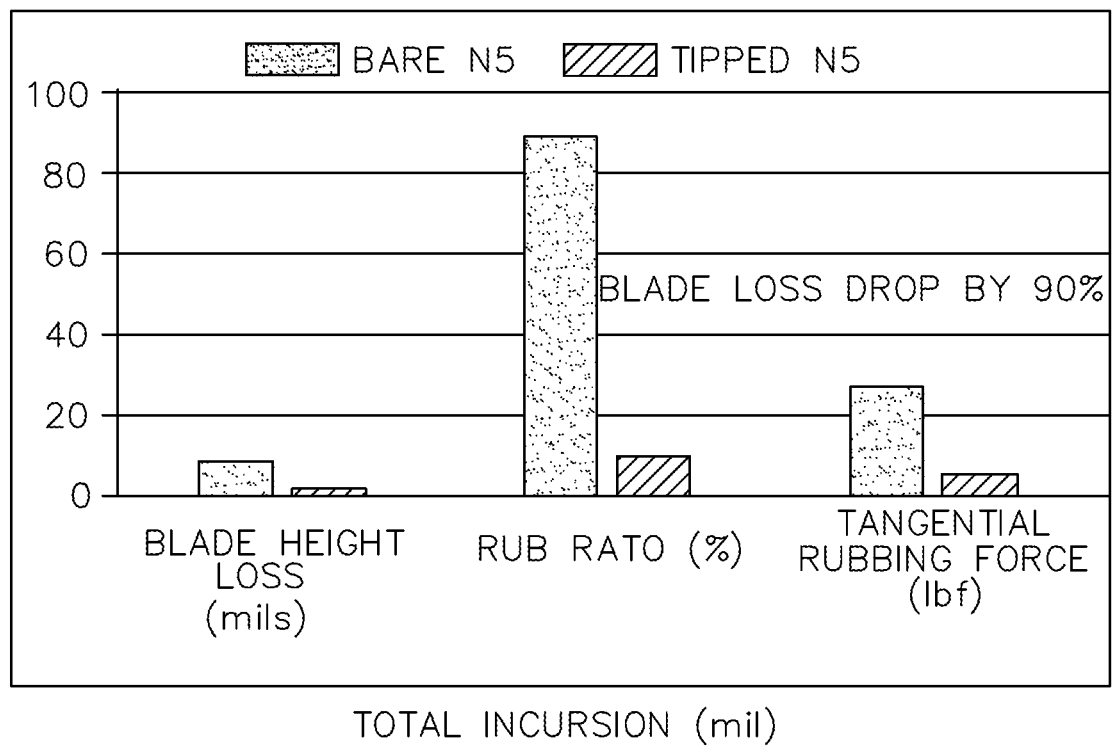
FIG. 10 provides a summary of the measured rub ratios for a bare turbine blade tip and a cooled, coated turbine blade tip, in accordance with one embodiment of the present disclosure.

FIG. 10 illustrates a summary of the measured blade loss, rub ratios (blade loss/total incursion %), and friction forces for a bare blade, such as the turbine blade 120 of FIG. 7 and a turbine blade including the channel cooling passages and coating system as disclosed herein, such as the turbine blade 130 of FIGS. 8 and 9.

Reducing blade wear has been challenging for turbine blades, and in particular metallic turbine blades. Regardless of the environmental temperature, the blade tip temperature can exceed the metal's softening point during high speed rubbing due to the high rubbing forces associated with high blade tip speed and relatively low thermal convection/conduction at the blade tip. Reducing the shroud coating stiffness benefits blade wear, but can also result in shorter coating life. To minimize blade wear in a rubbing event, it has been found that materials with a higher strength and stiffness than the shroud materials can beneficially be applied to the turbine blades, in particular blade tips. There is a feasible way of reducing the blade wear by integrating direct cooling to the blade tip in an effort to prevent oxidation of an abrasive coating system, whereby the coating system has a higher strength than a bare blade tip) to cut the shroud coating and thus mitigating blade wear. FIG. 10 compares the rub ratios obtained from bare metal blades ("Bare N5") versus direct cooled blades including cooling passages and coated with the coating system as disclosed herein, ("Tipped N5"). As shown in FIG. 10, the inclusion of cooling passages in the blade tip, in combination with coating the blade tip with an abrasive layer as disclosed herein, provided a drop in rub ratio of about 80% compared to bare blades.

The coating system applied to the cooled turbine blades in use with EBC-coated CMC shrouds provides reduced blade wear in rubbing events. Without intending to be bound by theory, the cooled blade having a coating system disposed thereon functions by: (1) preventing oxidation of the abrasive particles within the coating system prior to completion of the rub event; (2) cutting into EBC layers due to the higher hardness of the coating system; and (3) isolating the metal blade tip from overheating during rubbing (significantly lower rubbing force), thereby mitigating blade wear. In comparison to a bare N5 blade, the rub ratio of a cooled blade tip with the coating system on EBC abradables was reduced from about 90% to about 10%, implying 8 mil clearance improvement for a 10 mil incursion.

It is understood that in the method shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contained the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A coated turbine blade, the coated turbine blade comprising:
    a turbine blade defining one or more cooling passages and a squealer blade tip, each of the one or more cooling passages extending from a plenum defined within the turbine blade to an opening on an outer surface of a top of the squealer blade tip, wherein the turbine blade comprises a base material, wherein the base material comprises a metal; and
    a coating system disposed only along the outer surface of the top of the squealer blade tip, the coating system including a plurality of through-holes extending through the coating system and in fluid communication with the plenum, wherein each of the one or more cooling passages is machined through the squealer blade tip and wherein each of the plurality of through-holes is machined through the coating system.

2. The coated turbine blade according to claim 1, wherein the coating system is comprised of an abrasive layer.

3. The coated turbine blade according to claim 2, wherein the abrasive layer is comprised of a plurality of abrasive grit particles encapsulated in a matrix alloy.

4. The coated turbine blade according to claim 3, wherein the abrasive grit particles are comprised of cubic boron nitride (cBN), alumina ($Al_2O_3$), diamond, rhenium diboride (c-axis), silicon carbide, titanium carbide, tungsten carbide, titanium nitride, silicon nitride, or tantalum carbide, and combinations thereof.

5. The coated turbine blade according to claim 4, wherein the matrix alloy is comprised of cobalt-nickel-chrome-aluminum-yttrium (CoNiCrAlY).

6. The coated turbine blade according to claim 4, wherein the abrasive layer is disposed along the outer surface of the top of the squealer blade tip.

7. The coated turbine blade according to claim 4, wherein the coating system further comprises a buffer layer.

8. The coated turbine blade according to claim 7, wherein the buffer layer is disposed along the outer surface of the top of the squealer blade tip and the abrasive layer is disposed along an outer surface of the buffer layer.

9. The coated turbine blade according to claim 8, wherein the buffer layer comprises a nickel superalloy, a cobalt superalloy, an iron superalloy, or combinations thereof.

10. The coated turbine blade according to claim 1, wherein each of the plurality of through-holes extends from one of the one or more cooling passage openings on the outer surface of the top of the squealer blade tip through the coating system.

11. The coated turbine blade according to claim 1, wherein the metal of the base material is one of a nickel-superalloy or cobalt-superalloy.

12. The coated turbine blade according to claim 1, wherein the turbine blade is configured to face a shroud of a high pressure turbine.

13. A system comprising:
 a turbine blade defining one or more cooling passages and a squealer blade tip, each of the one or more cooling passages extending from a plenum defined within the turbine blade to an opening on an outer surface of a top of the squealer blade tip, wherein the turbine blade comprises a base material;
 an abrasive layer overlying only the outer surface of the top of the squealer blade tip, the abrasive layer including a plurality of through-holes extending through the abrasive layer and in fluid communication with the plenum, wherein each of the one or more cooling passages is machined through the squealer blade tip and wherein each of the plurality of through-holes is machined through the coating system; and
 a shroud comprising a ceramic matrix composite (CMC);
 wherein the base material comprises a metal, and
 wherein the shroud is coated with an environmental barrier coating (EBC).

14. The system according to claim 13, wherein the abrasive layer comprises a plurality of abrasive grit particles encapsulated in a matrix alloy.

15. The system according to claim 14, wherein the abrasive grit particles are comprised of cubic boron nitride (cBN), alumina ($Al_2O_3$), diamond, rhenium diboride (c-axis), silicon carbide, titanium carbide, tungsten carbide, titanium nitride, silicon nitride, or tantalum carbide, and combinations thereof and the matrix alloy is comprised of cobalt-nickel-chrome-aluminum-yttrium (CoNiCrAlY).

16. The system according to claim 13, wherein the turbine blade metal comprises one of a nickel-superalloy or cobalt-superalloy.

17. The system according to claim 13, further comprising a buffer layer disposed along the outer surface of the top of the squealer blade tip, the abrasive layer disposed along an outer surface of the buffer layer.

18. A method of forming a turbine blade configured for use with a ceramic matrix composite (CMC) shroud coated with an environmental barrier coating (EBC), the method comprising:
 casting the turbine blade including a plurality of cooling passages extending from a plenum in the turbine blade to a plurality of cooling passage openings at an outer surface of a top of a squealer blade tip of the turbine blade; and
 applying a coating system only on the outer surface of the top of the squealer blade tip, wherein the coating system is disposed along the outer surface of the top of the squealer blade tip and includes a plurality of through-holes extending through the coating system and in fluid communication with the plenum, wherein each of the plurality of cooling passages is machined through the squealer blade tip and wherein each of the plurality of through-holes is machined through the coating system.

19. The method of claim 18, wherein the step of applying the coating system comprises laser cladding an abrasive layer overlying the outer surface of the top of the squealer blade tip.

20. The method of claim 19, wherein the step of applying the coating system comprises laser cladding the abrasive layer on an outer surface of a buffer layer disposed on the outer surface of the top of the squealer blade tip.

21. The method of claim 19, wherein the abrasive layer is comprised of a plurality of abrasive grit particles encapsulated in a matrix alloy.

* * * * *